3,228,833
ANTICOCCIDIAL COMPOSITIONS AND
METHODS OF USING SAME
Nathan N. Crounse and Robert J. Schumacher, Cincinnati, Ohio, assignors to Sterling Drug Inc., New York, N.Y., a corporation of Delaware
No Drawing. Filed Dec. 17, 1962, Ser. No. 244,864
10 Claims. (Cl. 167—53.1)

This invention relates to chemotherapeutic compositions useful in animal husbandry and in particular relates to compositions and methods for the prevention and suppression of coccidiosis.

Coccidiosis, a disease of great economic importance because of its epidemic nature and its destructiveness to poultry, is caused by protozoan organisms known as coccidia, and in particular, by certain species of the genus Eimeria. Coccidia gain access to the host by way of ingested food, drinking water, or soil contaminated with oöcysts which are found in fecal droppings of fowl harboring the parasites. The coccidia multiply in the gastro-intestinal tract and erode the epithelial tissues of the cecum and intestines, causing hemorrhage weakness, emaciation, and digestive disturbances. The fowl which survive severe infections are left in a state of debilitation which substantially reduces their market value.

Of the numerous remedies which have been suggested for the control of coccidiosis, many are too inefficient, prohibitively expensive, or too toxic for prophylactic administration. Moreover, with the previously available remedies there may be encountered such metabolic difficulties as poisoning of the hematopoietic system and a subsequent reduction in the number of red and white blood cells, adverse effect on fertility, color, taste, or odor of eggs produced by the birds, and unpalatability of the flesh of the birds. The need for new and improved means for controlling coccidial infections in poultry has therefore remained a serious problem in the poultry industry.

It is an object of this invention to provide novel compounds which are useful as anticoccidial agents when administered to poultry in prophylactic quantities. It is another object of this invention to provide novel feed compositions useful for the prevention and suppression of coccidiosis in poultry. It is still another object of this invention to provide a new and useful method for the control of coccidiosis in poultry.

In accordance with the present invention, we have discovered that coccidiosis in poultry can be prevented and suppressed by administering to the birds, preferably in combination with poultry feed, a small quantity of a compound of the general Formula I,

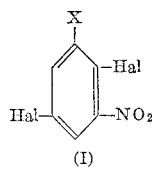

(I)

wherein X is a member of the group consisting of $CONH_2$, CONHR, CONRR', CONHNHCOR, CONHNRR', CONHOH, and CN, wherein R and R' can be the same or different and are selected from the group consisting of lower-alkyl, lower-alkenyl, phenyl, benzyl, pyridyl, thienyl, thiazolyl, pyrazolyl, oxazolyl, and furyl. The foregoing radicals can be unsubstituted or they can be substituted by from one to three substituents inert toward other functional groupings in the molecule, and Hal is halogen. Hence we have found that the above compounds possess an unobvious utility as intermediates for the preparation of medicated poultry feed compositions.

When representing lower-alkyl, R is a straight- or branched-chain saturated hydrocarbon radical preferably of from one to six carbon atoms. Examples of lower-alkyl radicals are methyl, ethyl, n-propyl, isopropyl, n-butyl, isobutyl, tert-butyl, n-pentyl, n-hexyl and the like.

When representing lower-alkenyl, R is a straight- or branched-chain hydrocarbon radical preferably of from two to six carbon atoms and having at least one double bond. Examples of lower-alkenyl radicals are vinyl, allyl, methallyl, 1-(3-pentenyl,),1-(2,4-hexadienyl) and the like.

The lower-alkyl and lower alkenyl radicals and the benzyl, phenyl, pyridyl, thienyl, thiazolyl, pyrazolyl, oxazolyl, and furyl radicals represented in Formula I by R can be substituted with from one to three substituents which are inert toward other functional groupings in the molecule. The substituents are preferably of low molecular weight, and where there is more than one, they can be the same or different. Examples of suitable inert substituents are hydroxy, halo, carboxy, amino, lower-alkylamino, di-(lower-alkyl)amino, nitro, lower-alkoxy, and lower-alkylmercapto. Examples of substituted radicals represented by R thus are, aminoethyl, dimethylaminopropyl, 2,3-dihydroxypropyl, 6-methoxyhexyl, 4-nitrophenyl, 3,4-dichlorophenyl, 4'-nitro-2'-chlorobenzyl, 5-nitro-2-furyl, 5-bromo-2-thiazolyl, 4-methoxy-2-pyridyl and the like.

In Formula I, Hal represents halogen, and hence is selected from the group consisting of fluorine, chlorine, bromine, and iodine. Preferred halogens for the purposes of this invention because of the ready availability of necessary starting materials, are chlorine and bromine.

The amide compounds of Formula I are prepared by reacting a primary or secondary amine with an acylating agent derived from 2,5-dihalo-3-nitrobenzoic acid. Effective acylating agents are 2,5-dihalo-3-nitrobenzoyl halides, for example 2,5-dichloro-3-nitrobenzoyl chloride, 2,5-dibromo-3-nitrobenzoyl bromide, and the like. The acylating agents can be prepared from their corresponding acids according to general and well-known methods. As an example, 2,5-dichloro-3-nitrobenzoyl chloride can be prepared from 2,5-dichloro-3-nitrobenzoic acid and thionyl chloride either alone or in the presence of an inert solvent. Where the intermediate acid is not readily available, it can be prepared by reacting a p-dihalo-benzene (e.g., p-dibromobenzene, p-dichlorobenzene, p-difluorobenzene, or p-diiodobenzene) with phosgene under Friedel-Crafts reaction conditions, followed by hydrolysis to 2,5-dihalobenzoic acid and subsequent nitration with a nitrating agent, for example a mixture of nitric and sulfuric acids.

The reaction of primary and secondary amines with 2,5-dihalo-3-nitrobenzoyl halide is preferably conducted at low temperatures (that is, below room temperature) to lessen the incidence of side reactions. Where the amine is water-soluble and inexpensive, as for example with methylamine, ethylamine and ethanolamine, it is convenient to add the 2,5-dihalo-3-nitrobenzoyl halide to an excess of the amine in water and ice, whereupon the desired amide separates in nearly pure form from the aqueous solution. Alternatively, the reaction can be conducted under Schotten-Baumann reaction conditions, that is, in the presence of ice and aqueous sodium hydroxide.

The compounds of Formula I wherein X is the cyano group can be prepared by dehydrating the corresponding compound wherein X is $CONH_2$ with standard dehydrating reagents, for example, phosphorus pentoxide, phosphorus oxychloride, or thionyl chloride.

As another alternative the compounds of Formula I can be prepared by nitrating the corresponding 2,5-dihalobenzamides and 2,5-dihalobenzonitriles with a nitrating agent, for example, fuming nitric acid.

In another of its aspects, our invention provides novel compositions for the prevention and suppression of coccidiosis in poultry which comprises poultry feed having dispersed therein as an effective anticoccidial ingredient a compound of Formula I.

In another of its aspects, our invention provides a method for preventing and suppressing coccidiosis in poultry which comprises administering to the poultry a compound of Formula I.

In still another of its aspects, our invention provides the novel and useful compounds of Formula II

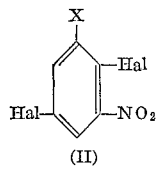

(II)

wherein X is a member selected from the group consisting of CONHR, CONRR', CONHNHCOR, CONHNRR', CONHOH, and CN and Hal is halogen and wherein R and R' are substituents identical to R and R' described in Formula I.

The administraion of compounds represented by Formula I has been found to protect poultry from coccidial infections. The compounds are useful for the prophylactic treatment of poultry both prior to and concurrently with exposure of the poultry to infection. It is most practical to administer the medicament daily to the poultry flock as a dosage level which affords continuous protection against coccidiosis.

Although the optimum prophylactic daily dosage of the above-described compounds varies according to the age and weight of the poultry, we have found that satisfactory results are obtained in the management of coccidiosis when each bird receives the medicament at a level of about 0.005 to 0.2 percent by weight of the daily diet of the bird. When administered in feed, the concentration of the anticoccidial ingredient therein can be varied considerably, and it is only necessary to adjust the concentration so that an effective dose of the compound is ingested by the bird in consuming its daily ration of food. Thus, good results are obtained when each bird is fed a commercial poultry feed containing about 0.005 to 0.2 percent by weight (that is 0.1–4 pounds per ton) of a medicament selected from the group represented by Formula I.

Feed compositions containing a medicament of Formula I in any desired amount can be readily prepared by dispersing the compound in the feed as the sole or part ration of the poultry, as by mechanically mixing the compound in finely ground form with the feed or dispersing a solution of the compound in the food and either removing the solvent, or, if the solvent is innocuous, allowing it to remain in the feed. The feed composition can be prepared either for direct use by mixing 0.005 to 0.2 percent of the medicament by weight with the feed; or, if desired, a concentrated pre-mix feed can be obtained by using a considerably larger percentage of medicament, for example, 10 to 40 percent by weight, which is suitable for subsequent blending with a larger amount of the same or a different kind of poultry feed to arrive at the desired concentration of medicament for feeding.

In preparing the medicated feeds of our invention, there can be used any suitable poultry feed, such as a commercial mash of the starting, growing, or laying type, which will satisfactorily supply the normal nutritional requirements of the birds. These feeds commonly contain ground grains and various other added ingredients such as vitamins, minerals, powdered milk, meat or protein substitute, and the like.

The following examples will further illustrate our invention, without the latter being limited thereto.

EXAMPLE 1

*2,5-dichloro-3-nitro-N-methylbenzamide.*—A solution containing 236 g. (1.0 mole) of 2,5-dichloro-3-nitrobenzoic acid and 175 g. (1.47 mole) of thionyl chloride in one liter of toluene was slowly heated and then refluxed until evolution of hydrogen chloride and sulfur dioxide was complete. The unreacted thionyl chloride and about two-thirds of the solvent were then distilled from the reaction mixture containing 2,5-dichloro-3-nitrobenzoyl chloride. The latter was cooled and poured into a well-stirred solution containing a large excess of methylamine in ice and water. The temperature of the resulting mixture was maintained below 20° C. by the addition of ice. The aqueous layer was decanted, and the organic phase was washed repeatedly with water. The crude 2,5-dichloro-3-nitro-N-methylbenzamide which precipitated from the toluene layer was collected and recrystallized from ethanol. Pure 2,5-dichloro-3-nitro-N-methylbenzamide thus prepared melted at 169.8–171.0° C. (corr.).

2,5-dichloro-3-nitro-N-methylbenzamide was dispersed uniformly in a basic poultry feed, producing medicated feed compositions containing from about 0.00625 to 0.1 percent each by weight of medicament. These compositions and unmodified basic poultry feed were fed as the sole ration to six lots of nine 4 week old chickens of a White Plymouth Rock cross. Forty-eight hours after this diet was started, the birds were inoculated with a multiple species inoculum consisting of 80,000 sporulated oocysts each of the species *E. tenella, E. maxima, E. nectarix,* and *E. brunetti,* 600,000 of *E. acervulina,* and 400,000 of *E. hagani.* Fourteen days after inoculation, the birds were weighed and tallied for death due to coccidiosis. The results are reported in the following Table I:

*Table I*

| Lot No. | Medication (percent) by weight of the diet | Ave. wt. in grams at inoculation | Ave. wt. gained 14 days after inoculation (in grams) | Mortalities (Coccidiosis) |
|---|---|---|---|---|
| 1 | None | 382 | 60 | 5 |
| 2 | 0.05 | 366 | 263 | 0 |
| 3 | 0.025 | 367 | 254 | 0 |
| 4 | 0.0125 | 353 | 214 | 0 |
| 5 | 0.00625 | 375 | 228 | 0 |
| 6 | 0.1 | 336 | 247 | 0 |

EXAMPLE 2

*2,5-dichloro-3-nitrobenzamide.*—Following the procedure given in Example 1, 2,5-dichloro-3-nitrobenzoic acid was reacted with thionyl chloride and ammonium hydroxide. Recrystallized from ethanol, the resulting 2,5-dichloro-3-nitrobenzamide melted at 198.2–200.2° C. (corr.). This compound has previously been reported to have herbicidal properties.

The efficacy of 2,5-dichloro-3-nitrobenzamide in preventing and suppressing development of coccidiosis was tested as in Example I, and the results are given in the following Table II:

*Table II*

| Lot No.* | Medication (percent) by weight of the diet | Ave. wt. at inoculation (in grams) | Ave. wt. gained 14 days after inoculation (in grams) | Mortalities (Coccidiosis) |
|---|---|---|---|---|
| 1 | None | 608 | 91 | 4 |
| 2 | 0.05 | 663 | 177 | 0 |
| 3 | 0.025 | 646 | 137 | 1 |
| 4 | 0.0125 | 646 | 271 | 2 |

*Ten straight run six-week old White Plymouth Rock cross chickens per lot.

EXAMPLE 3

*2,5-dichloro-3-nitro-N-ethylbenzamide.*—Following the procedure given in Example 1, 2,5-dichlorobenzoic acid was reacted with thionyl chloride and ethylamine. Recrystallized from ethanol, the resulting 2,5-dichloro-3-nitro-N-ethylbenzamide melted at 161.2–163.6° C. (corr.).

The efficacy of 2,5-dichloro-3-nitro-N-ethylbenzamide in preventing and suppressing development of coccidiosis was tested as in Example I, and the results are given in the following Table III:

Table III

| Lot No. | Medication (percent) by weight of the diet | Ave. wt. in grams at inoculation | Ave. wt. gained 14 days after inoculation (in grams) | Mortalities (Coccidiosis) |
|---|---|---|---|---|
| 1 | None | 382 | 60 | 5 |
| 2 | 0.1 | 415 | 201 | 0 |
| 3 | 0.05 | 388 | 299 | 0 |
| 4 | 0.025 | 379 | 154 | 0 |
| 5 | 0.0125 | 391 | 145 | 0 |
| 6 | 0.00625 | 411 | 215 | 0 |

The following examples of our invention are prepared according to the procedure of Example 1 by substituting the appropriate amine for the methylamine therein:

EXAMPLE 4

2,5-dichloro - 3 - nitro-N-(2-hydroxyethyl)benzamide, having a melting point of 145.4–146.2° C. (corr.).

EXAMPLE 5

2,5-dichloro-3-nitro-N,N-dimethylbenzamide, having a melting point of 146.0–147.7° C. (corr.).

EXAMPLE 6

2,5-dichloro-3,4'-dinitrobenzanilide, having a melting point of 219.0–220.2° C. (corr.).

EXAMPLE 7

2,5-dichloro-3-nitro-N-(2-thiazolyl)benzamide, melting with decomposition at 277.0–278.2° C. (corr.).

EXAMPLE 8

2,5-dichloro - 3 - nitro-N-(3-dimethylaminopropyl)benzamide, having a melting point of 91.4–96.2° C. (corr.).

EXAMPLE 9

2,5,3',4'-tetrachloro-3-nitrobenzanilide, having a melting point of 195–197° C.

EXAMPLE 10

2,5-dichloro-3-nitrobenzohydroxamic acid, having a melting point of 180–182° C.

EXAMPLE 11

2,5-dichloro-3-nitro-N-sec.-butylbenzamide, having a melting point of 130.6–132.8° C. (corr.).

EXAMPLE 12

2,5-dichloro-3-nitro-N-isobutylbenzamide, having a melting point of 151.8–153.0° C. (corr.).

EXAMPLE 13

2,5-dichloro-3-nitro-N-tert.-butylbenzamide, having a melting point of 163.6–165.2° C. (corr.).

EXAMPLE 14

2,5-dichloro- 3 - nitro - N - (1,1,3,3-tetramethylbutyl)benzamide, having a melting point of 154.6–155.8° C. (corr.).

EXAMPLE 15

2,5-dichloro-3-nitro-N-(n-propyl)benzamide, having a melting point of 137.2–138.2° C. (corr.).

EXAMPLE 16

2,5-dichloro-3-nitro-N-(n-butyl)benzamide, having a melting point of 122.8–124.0° C. (corr.).

EXAMPLE 17

2,5-dichloro-3-nitro-N-(n-pentyl)benzamide, having a melting point of 105.8–106.4° C. (corr.).

EXAMPLE 18

2,5-dichloro-3-nitro-N-allylbenzamide, having a melting point of 139.0–140.2° C. (corr.).

EXAMPLE 19

2,5-dichloro-3-nitro-N-(n-hexyl)benzamide having a melting point of 99–103° C.

EXAMPLE 20

2,5-dichloro-3-nitro-N-isopropylbenzamide, having a melting point of 142.0–143.0° C. (corr.).

EXAMPLE 21

1,2-bis(2,5-dichloro-3-nitrobenzoyl)hydrazine, having a melting point of 331.5–334° C. (corr.).

EXAMPLE 22

3-(2,5-dichloro-3-nitrobenzoylamino)benzoic acid.

EXAMPLE 23

2,5-dichloro-3-nitro-N-[2-(5-nitro)furyl]benzamide.

EXAMPLE 24

2,5-dichloro-3-nitro-N-(2-pyridyl)benzamide.

EXAMPLE 25

2,5-dichloro-3-nitro-N-(2-thienyl)benzamide.

EXAMPLE 26

2,5-dichloro-3-nitro-benzanilide.

EXAMPLE 27

2,5-dichloro-3-nitro-N-methylbenzanilide.

EXAMPLE 28

2,5-dichloro-3-nitro-N-benzylbenzamide.

EXAMPLE 29

2,5-dichloro-3-nitro-N-(2,4-dichlorobenzyl)benzamide.

EXAMPLE 30

2,5-dichloro-3-nitro-N-(3',4',5'-trimethoxy)benzanilide.

EXAMPLE 31

2,5-dibromo-3-nitrobenzamide is prepared in the manner described in Example 1 from ammonium hydroxide, thionyl chloride, and 2,5-dibromo-3-nitrobenzoic acid. The latter compound is prepared from p-dibromobenzene and phosgene in the presence of aluminum chloride under Friedel-Crafts reaction conditions, followed by hydrolysis to 2,5-dibromobenzoic acid and subsequent nitration with mixed nitric and sulfuric acids.

EXAMPLE 32

2,5-dichloro-3-nitro - N',N' - dimethylbenzhydrazide is prepared from 2,5-dichloro-3-nitrobenzoyl chloride and N,N-dimethylhydrazine.

EXAMPLE 33

N-(2,5-dichloro - 3 - nitrobenzoyl)-N'-isopropylidenehydrazine is prepared by reacting 2,5-dichloro-3-nitrobenzoyl chloride with isopropylidenehydrazine (acetone hydrazone).

EXAMPLE 34

2,5-dichloro-3-nitrobenzonitrile is prepared by refluxing 2,5-dichloro-3-nitrobenzamide with thionyl chloride until the evolution of hydrogen chloride and sulfur dioxide is complete.

We claim:
1. A composition for the prevention and suppression of coccidiosis in poultry which comprises poultry feed having dispersed therein as an effective anticoccidial ingredient a compound of the formula

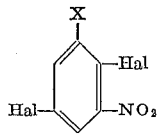

wherein X is a member of the group consisting of $CONH_2$, CONHR, CONRR', CONHNHCOR, CONHNRR', CONH—OH, and CN, and Hal is halogen, wherein R and R' are members selected from the group consisting of lower-alkyl, lower-alkenyl, phenyl, benzyl, pyridyl, thienyl, thiazolyl, pyrazolyl, oxazolyl, and furyl.

2. A composition for the prevention and suppression of coccidiosis in poultry which comprises poultry feed having 2,5-dichloro-3-nitrobenzamide dispersed therein as an effective anticoccidial ingredient.

3. A composition for the prevention and suppression of coccidiosis in poultry which comprises poultry feed having 2,5-dichloro-3-nitro-N-methylbenzamide dispersed therein as an effective anticoccidial ingredient.

4. A composition for the prevention and suppression of coccidiosis in poultry which comprises poultry feed having 2,5-dichloro-3-nitro-N-ethylbenzamide dispersed therein as an effective anticoccidial ingredient.

5. A poultry feed containing from 0.005 to 0.2 percent by weight of a compound of the formula

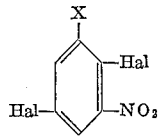

wherein X is a member of the group consisting of $CONH_2$, CONHR, CONRR', CONHNHCOR, CONHNRR', CONHOH, and CN, and Hal is halogen wherein R and R' are members selected from the group consisting of lower-alkyl, lower-alkenyl, phenyl, benzyl, pyridyl, thienyl, thiazolyl, pyrazolyl, oxazolyl, and furyl.

6. A poultry feed containing from 0.005 to 0.2 percent by weight of 2,5-dichloro-3-nitrobenzamide.

7. The method for the prevention and suppression of coccidiosis in poultry which comprises administering to the poultry a compound of the formula

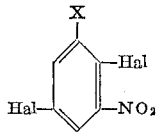

wherein X is a member of the group consisting of $CONH_2$, CONHR, CONRR', CONHNHCOR, CONHNRR', CONHOH, and CN, and Hal is halogen wherein R and R' are members selected from the group consisting of lower-alkyl, lower-alkenyl, phenyl, benzyl, pyridyl, thienyl, thiazolyl, pyrazolyl, oxazolyl, and furyl.

8. The method claimed in claim 7 wherein the compound administered is 2,5-dichloro-3-nitrobenzamide.

9. The method claimed in claim 7 wherein the compound administered is 2,5-dichloro-3-nitro-N-methylbenzamide.

10. The method claimed in claim 7 wherein the compound administered is 2,5-dichloro-3-nitro-N-ethylbenzamide.

References Cited by the Examiner

UNITED STATES PATENTS

| | | | |
|---|---|---|---|
| 2,776,978 | 1/1957 | Dodson | 260—306.8 |
| 2,860,166 | 11/1958 | Newcomer | 260—558 |
| 3,052,602 | 9/1962 | Hymas | 167—53.1 |
| 3,066,147 | 11/1962 | Carmack | 260—306.8 |
| 3,087,856 | 4/1963 | Actor | 167—53.1 |

FOREIGN PATENTS 830,060  3/1960  Great Britain.

OTHER REFERENCES

Amchem Products Inc., Chem. Abst., vol. 54, 1960, p. 15820f.

JULIAN S. LEVITT, *Primary Examiner.*

FRANK CACCIAPAGLIA, JR., *Examiner.*